(12) United States Patent
Wiens

(10) Patent No.: US 7,036,637 B1
(45) Date of Patent: May 2, 2006

(54) TIRE CHOCKING APPARATUS

(76) Inventor: Randy Wiens, 212 N. "F" St., Wellington, KS (US) 67152

( * ) Notice: Subject to any disclaimer, the term of this patent is extended or adjusted under 35 U.S.C. 154(b) by 0 days.

(21) Appl. No.: 10/985,565

(22) Filed: Nov. 10, 2004

(51) Int. Cl.
*B61H 13/00* (2006.01)
(52) U.S. Cl. ............................. 188/36; D12/217; 188/5
(58) Field of Classification Search ............... 188/36, 188/32, 4 R, 4 B, 5, 37; D12/217
See application file for complete search history.

(56) References Cited

U.S. PATENT DOCUMENTS

| | | | |
|---|---|---|---|
| 2,720,285 A * | 10/1955 | Taylor | 188/32 |
| 3,338,338 A | 8/1967 | Lindeen | |
| 3,493,083 A * | 2/1970 | Lightowler | 188/32 |
| 3,547,228 A | 12/1970 | Wiley | |
| 3,695,394 A * | 10/1972 | Carpenter | 188/32 |
| 3,700,077 A * | 10/1972 | Harder | 188/32 |
| 3,845,844 A | 11/1974 | Woemer | |
| 4,155,429 A | 5/1979 | Schessl | |
| 4,804,070 A * | 2/1989 | Bohler | 188/32 |
| 4,828,076 A | 5/1989 | Fox | |
| 4,926,722 A | 5/1990 | Sorensen et al. | |
| 5,009,134 A | 4/1991 | Sorensen et al. | |
| 5,022,137 A | 6/1991 | Sorensen et al. | |
| D320,919 S | 10/1991 | Sorensen et al. | |
| 5,158,158 A | 10/1992 | Balogh | |
| 5,368,134 A | 11/1994 | Rickman et al. | |
| 5,421,625 A | 6/1995 | Arko | |
| 5,490,582 A | 2/1996 | Trowbridge | |
| 5,547,045 A | 8/1996 | Stutzman | |
| 5,913,389 A * | 6/1999 | Clark | 188/32 |
| 2002/0141852 A1 | 10/2002 | Hahn et al. | |
| 2004/0108172 A1 | 6/2004 | Fox | |

* cited by examiner

*Primary Examiner*—Melanie Torres
(74) *Attorney, Agent, or Firm*—Kenneth H. Jack; Davis & Jack, L.L.C.

(57) ABSTRACT

A tire chocking apparatus consisting of first and second tire chocks, a spreader jack interconnecting the first and second tire chocks; a handle fixedly attached to or formed wholly with the spreader jack, the handle extending upwardly from the spreader jack, the handle having an upper end; a reciprocatable member mounted moveably upon the handle's upper end; and a drive linkage interconnecting the reciprocatable member and the spreader jack.

16 Claims, 4 Drawing Sheets

“TIRE CHOCKING APPARATUS

FIELD OF THE INVENTION

This invention relates to apparatus adapted for securing tandem axle trailers against uncontrolled down hill or down slope rolling. More particularly, this invention relates to such apparatus which incorporate paired chocks or friction plates which are alternately longitudinally extendable and retractable.

BACKGROUND OF THE INVENTION

Tandem axle trailers characteristically exhibit several functional advantages over single axle trailers. For example, tandem axle trailers double the number of load bearing points upon the under surface of a trailer's chassis or frame, enabling the frame to effectively carry a greater load. Also, tandem axle trailers are more stable and have less tendency to sway while being pulled along a highway at high speeds. Also, in the event of a trailer tire blowout, tandem axle trailers are less likely than single axle trailers to experience a catastrophic failure and crash.

Where a tandem axle trailer is to be parked upon a sloped surface, such trailers offer further advantages over single axle trailers. In order to secure a single axle trailer against down slope rolling, tire chocks are commonly wedged between such trailer's tires and the ground or pavement. Such chocks are necessarily placed at the down hill or down slope side of the tires. When such trailer's tires roll or bias in the down slope direction against such wheel chocks, a combination of forces is directed against the wheel chocks, simultaneously driving the wheel chocks downwardly into the ground or pavement, and rearwardly away from the tires. Such rearwardly directed force may, on occasion, undesirably cause the tire chocks to eject rearwardly from beneath the tires, especially during low friction wet or icy weather conditions. Provision of mechanical structures which resist such chock ejection is desirable. However, single axle trailers typically present no structural surface which is suitable for countering such rearwardly directed force component. In contrast, tandem axle trailers do present a convenient structure (i.e., a rearwardly oriented second tire) as a source of base support for opposing such rearward chock ejecting force. Apparatus including paired wheel chocks and paired tire biasing friction plates which are adapted for alternate extension and retraction between longitudinally paired tires of a tandem axle trailer are known. Such apparatus may be categorized generally into two classes.

In a first class of such tandem axle tire securing apparatus, front and rear tire chocks beneficially dually engage both the ground and an up slope tandem axle trailer tire. Such tire engagement allows the down slope rolling bias of the uphill tire to frictionally lock the up hill chock between the ground and the tire. However, chock spreading mechanisms which are typically associated with such paired tire chocks are commonly positioned at or near ground level, requiring an operator to undesirably stoop to an elevation at or near ground level in order to manipulate such apparatus's actuating controls.

In a second class of the apparatus identified above, front and rear tire biasing friction plates engage longitudinally paired tires of a tandem axle trailer by biasing between such tires without any ground contact. Such apparatus advantageously minimize stooping needed for installation and de-installation of the device. However, the mechanical function of such apparatus undesirably relies exclusively upon force applied by its friction plate spreading mechanism to lock the longitudinally paired tires against rolling. In use of such mechanisms, the down hill or down slope rolling bias of the tires is incapable of wedging the mechanism against the ground for an additional tire locking effect. Instead, such apparatus undesirably tends to urge the mechanism to a tire releasing position. Any failure of the friction plate spreading mechanism or any rollable sliding along the friction plates may result in a release of tires and a catastrophic accident.

The instant inventive trailer tire chocking apparatus solves or ameliorates the problems discussed above by providing apparatus and structure which facilitates the above described protective utilization of ground wedging wheel chocks and by ergonomically facilitating installation, actuation and alternate removal of the apparatus without undue bending or stooping.

BRIEF SUMMARY OF THE INVENTION

Major structural components of the instant inventive wheel chocking apparatus comprise front and rear or first and second tire chocks. Each of the chocks preferably has a flat horizontal lower surface which is suitable for resting upon and sliding along ground or pavement surfaces. Also preferably, each of the tire chocks has an angled and concavely curved upper surface. The lower surfaces of the first and second tire chock, in combination with their angled and arcuately curved upper surfaces, preferably form a pair of wedges which are fitted for simultaneous forward and rearward insertions at the "V" shaped junctures between the ground or pavement and longitudinally paired tires of a tandem axle trailer. Suitably, the requisite first and second tire chocks may be alternately configured as simple flat faced wedges. Also suitably, though less desirably, the first and second tire chocks may be configured as roll stops or blocks, excluding forward and rearward "V" shaped tire wedging extensions.

Preferably, the first and second tire chocks are composed of high strength injection molded plastic. Suitably, the wheel chocks may be alternately composed of other durable materials such as wood or aluminum.

A wheel chock spreading mechanism or spreader jack is necessarily provided, the spreader jack necessarily spanning between and interconnecting the first and second tire chocks. Preferably, the spreader jack comprises a quill and shaft assembly wherein the quill houses first and second apertured shaft binding plates, and wherein the shaft of the assembly extends both through the bore of the quill and through the apertured binding plates. Preferably, the first and second shaft binding plates are respectively normally spring biased to shaft releasing and shaft binding positions. A shaft driving lever pivotally mounted upon the quill is preferably configured and positioned for biasing and driving against the first apertured shaft binding plate. In operation of such lever, its levering motion initially rotates such plate against its biasing spring from the normal shaft releasing position to a shaft binding position in which edge surfaces of the aperture frictionally "bite" against the shaft. Upon binding, the pivoting lever further levers both the first binding plate and the shaft along the bore of the quill, forcefully longitudinally spreading the tire chocks. Upon opposite counter-levering of the lever, the first shaft binding plate is rotatably spring biased to its shaft releasing position and is slidably driven rearwardly along the shaft. Preferably, the same spring which biases first binding plate also drives such counter-levering action. While the above described spring biasing occurs, the second shaft binding plate, which is normally held in its shaft binding position, resists any back sliding motion of the shaft. Suitably, though less desirably, other commonly known spreader jacking mechanisms, such as jack screw assemblies or rack gear and ratchet assemblies, may be substituted for the preferred quill, shaft, and shaft binding plates combination.

A handle necessarily extends upwardly from the instant invention's spreader jack. Where the spreader jack comprises the preferred quill and shaft combination, the handle is preferably formed wholly with or is fixedly attached to the quill. Preferably, a reciprocatable member just as "T" hook or "T" pull handle is mounted upon the upper end of the handle, such member preferably being manually operatable via an alternate hand squeezing or gripping action and releasing actions.

The requisite upwardly extending handle of the instant invention is preferably has a hollow bore which houses a spreader jack actuating drive linkage. Such linkage preferably operatively interconnects the reciprocatable member and the spreader jack. Where the spreader jack includes the preferred binding plate driving lever, as described above, the drive linkage preferably comprises a sliding rocker arm and shaft assembly which allows the reciprocating motion of the reciprocatable member at the upper end of the handle to operatively lever and counter-lever the plate driving lever. Suitably, a cable and pulley assembly may serve as a substitute for the preferred shaft and rocker arm assembly. Other commonly known drive linkages may also be substituted.

Preferably, the upper end of the handle of the instant invention is configured as loop or eye whose upper end presents a palm engaging surface. Also preferably, the reciprocating member comprises the above described "T" pull handle situated for alternate upward and downward motions within the opening of such handle. Such combination of loop and "T" pull advantageously allows the upper end of the handle to be alternately utilized in the manner of a common luggage handle for carrying the tire chocking apparatus, and as a hand grip actuator, allowing an operator to cause his or her grip to span an upper palm engaging surface of the loop and a lower finger engaging surface of the "T" pull for alternate gripping and releasing movements, causing the "T" pull to reciprocatingly move upwardly and downwardly within the opening of the loop.

Where the spreader jack of the instant invention comprises the preferred quill, shaft, and shaft binding plate combination as described above, the second shaft binding plate preferably wholly forms or has fixedly attachment thereto an upwardly extending shaft release lever. Preferably, such lever is substantially co-extensively with the handle, allowing an operator to manually operate such lever without undue bending or stooping.

In operation of the instant inventive tire chocking apparatus, and assuming a preferred configuration as described above, an operator may extend his or her fingers through the upper loop opening of the handle, and may grasp the loop in the manner of a common suitcase handle. Thereafter, the operator may carry the apparatus by such loop to a tandem axle trailer which is in need of being secured against rolling down a slope.

Thereafter, such operator may position the apparatus between a pair of the longitudinally paired tires of such tandem axle trailer, allowing the tire chocks, the quill, and the shaft to longitudinally align with the tread path of the trailer.

Thereafter, such operator may re-grasp the loop, allowing his or her palm to rest upon the extreme upper surface of the loop while the operator's fingers extend beneath finger engaging surfaces of the preferred "T" pull.

Thereafter, such operator may commence repeatedly manually upwardly drawing and downwardly releasing such "T" pull, reciprocatingly moving the "T" pull within the loop. The reciprocating motion is translated via the drive linkage, including the preferred rocker arm, to the plate driving lever, resulting in forceful longitudinal extension of the shaft via the above described mechanically coordinated shaft binding and shaft releasing events. The operator may continue to perform such gripping and relaxing "T" pull reciprocating action until the first and second tire chocks are securely wedged against the trailer's longitudinally paired tires.

In order to release and remove the inventive tire chocking apparatus, the operator may manually pivot the release lever toward the handle, causing the second shaft binding plate to move from its normal spring biased shaft binding position to its shaft releasing position. Upon tripping of the release lever, the spreader jack releases any longitudinally imposed chock positioning pressure sustained between the two tires, allowing the operator to utilize the handle in the manner of a rocking lever for loosening and disengaging the first and second tire chocks from beneath the trailer's tires.

All of the operations described above can be ergonomically performed without the requirement of excessive stooping by the operator to an elevation at or near ground level.

Accordingly, an object of the instant invention is the provision of a tandem axle trailer tire chocking apparatus which facilitates installation, and de-installation without stooping. For example, the vertical extension of the handle may be tailored to accommodate the needs of a wheelchair bound operator who is physically incapable of manipulating apparatus at ground level.

It is a further object of the instant invention to provide such a wheel chocking apparatus which extends and operationally installs paired tire chocks via the application of alternate hand gripping and hand releasing action upon a reciprocatable member interconnected with a spreader jack by a reciprocating drive linkage, and without requiring use of any tools.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
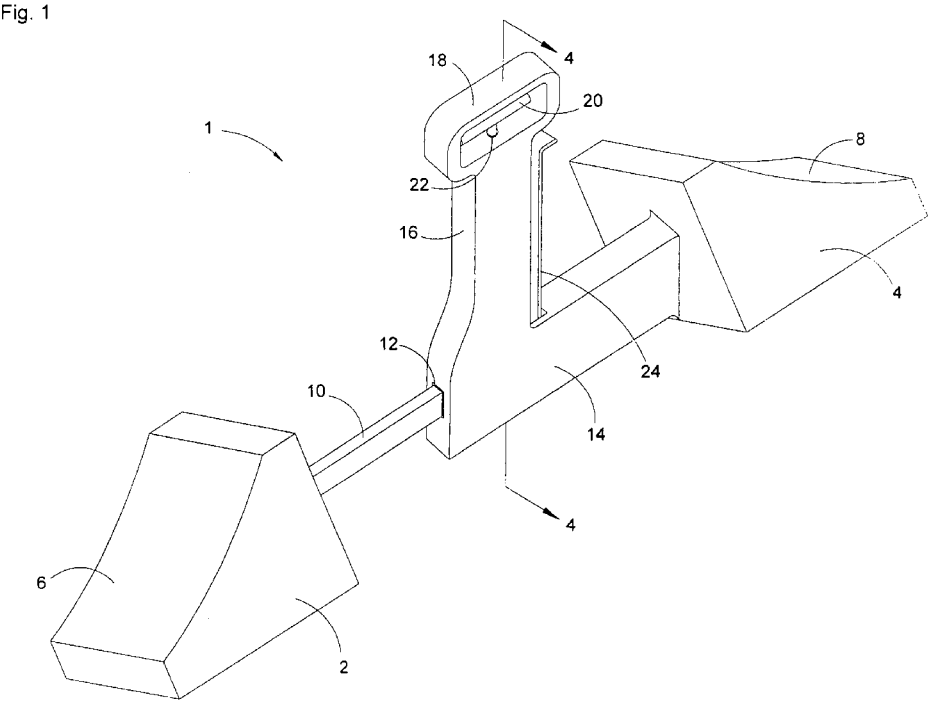
FIG. 1 is an isometric view of a preferred embodiment of the instant inventive tire chocking invention.

Referring now to the drawings, and in particular to FIG. 1, the instant inventive tire chocking apparatus is referred to generally by Reference Arrow 1. The apparatus 1 has a first or forward tire chock 2. The first tire chock 2 preferably has an upwardly angled and arcuately concave face 6. Preferably, referring further simultaneously to FIG. 3, the curvature of face 6 preferably matches the curvature of the outside diameter of a common trailer tire 26. A rear or second tire chock 4 having a curved face 8 is preferably configured substantially identically with chock 2. Chocks 2 and 4 are preferably composed of high strength injection molded plastic.

Figure 4:
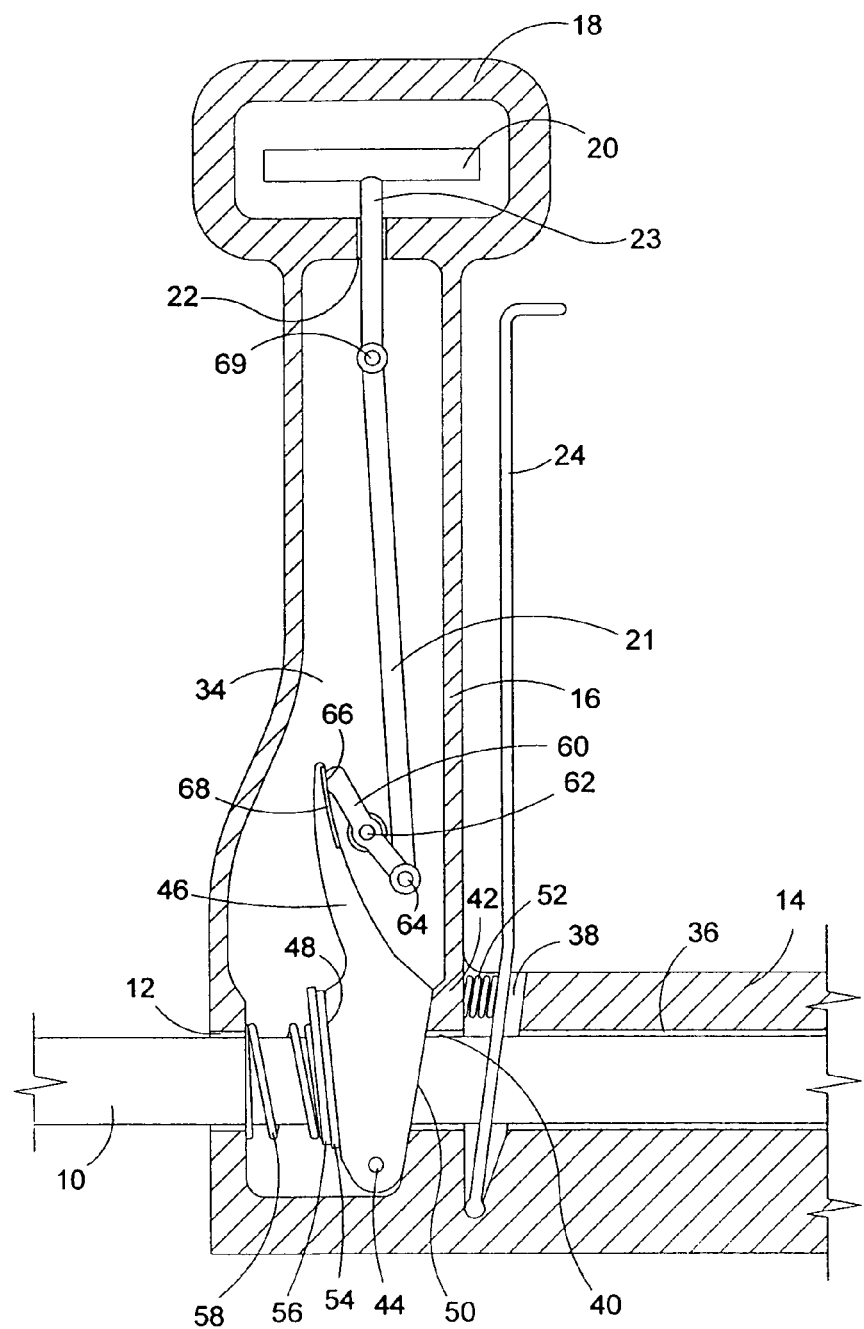
FIG. 4 is a sectional view as indicated in FIG. 1.

Referring simultaneously to FIGS. 1 and 4, a quill 14 having a hollow and longitudinally extending bore 12, 40, and 36 extending therethrough is preferably fixedly and rigidly attached to chock 4 or is formed wholly with chock 4. Preferably, the rearward channel 36 of quill 14 further extends rearwardly into the interior space of chock 4 for receipt of the rearward end of a steel slide shaft 10 into the interior of chock 4. The forward end of shaft 10 is preferably fixedly and rigidly mounted upon or embedded within the rearward end of chock 2.

Referring to FIG. 4, slide shaft 10 preferably extends through a compression spring 58, through an apertured shaft binding plate 56, through a matching apertured shaft binding plate 54, through a shaft driving lever 46, and finally through an apertured shaft binding plate 24. Spring 58 normally pivotally counter-levers lever 46 about pivot pin 44 so that such lever's rearward face 50 rests against channel face 42 of quill 14. In addition to counter-levering lever 46, spring 58 simultaneously rearwardly biases and rotates binding plates 56 and 54 against the forward face 48 of lever 46, such face allowing such plates to remain normally at rest in their non-plate binding positions. While plates 54 and 56 are rearwardly biased as depicted in FIG. 4, plates 54 and 56 are oriented in a position wherein shaft 10 may freely slide therethrough.

Referring further to FIG. 4, spring 52 normally rearwardly pivotally biases binding plate 24 to a rearwardly canted or angled orientation wherein such plate binds against slide shaft 10 for normally resisting any back sliding motion of slide shaft 10. Preferably, binding plate 24 is configured to ergonomically extend upwardly along handle 16 in the manner of a release lever. Upon manual biasing or levering of binding plate 24 toward handle 16 within space 38, shaft 10 is released for unrestricted forward and rearward sliding motions within the bore of quill 14;

Referring simultaneously to FIGS. 1 and 4, the upwardly extending handle 16 having a hollow bore 36 is preferably molded or formed wholly with quill 15. Preferably, the upper end of the handle 16 forms a loop or eye 18 which provides a peripheral frame of movement for a "T" pull handle 20. A drive linkage comprising an upper tie shaft 23, an upper pivot link 69, a lower tie shaft 21, a lower pivot link 64, and a rocker arm 60 operatively interconnects the plate driving lever 46 and the "T" pull handle 20. Preferably, the upper tie shaft 23 extends vertically through a closely fitted aperture 22 within lower end of loop 18. Also preferably, rocker arm 60 pivots about an axle 62 which laterally extends in the manner of rotatable journals into the lateral walls of the handle's hollow bore 34. The distal end 66 of rocker arm 60 preferably is slidably received by a slide channel plate 68, such plate preferably being fixedly mounted upon the distal end of lever 46.

Referring further simultaneously to FIGS. 1 and 4, an operator of the instant inventive tire chock apparatus 1 may place the palm of his or her left hand against the upper surface of handle loop 18. (A functionally equivalent right-handed version mirroring the assembly depicted in FIGS. 1 and 4 constitutes a preferred alternate embodiment.) Thereafter, such operator may extend the fingers of said hand beneath the "T" pull handle 20. Thereafter, such operator may squeeze or tighten the grip of such hand, drawing "T" pull handle 20 upwardly within the opening of loop 18. Such upward motion of handle 20 sequentially draws tie shaft 23 upwardly through aperture 22, and draws tie shaft 21 upwardly within the hollow bore 34 of handle 16. The upward motion of tie shaft 21 pulls upwardly on pivot pin 64, upwardly levering the lower end of rocker arm 60 about axle 62. Such levering action simultaneously drives the distal end 66 of rocker arm 60 in a counter-clockwise pivoting motion against the slide plate 68 which is mounted upon the distal end of the plate driving lever 46.

As the distal end 66 of rocker arm 60 slides downwardly along slide plate 68, lever 46 pivots or levers counter-clockwise about its pivot pin 44, slightly rotating binding plates 54 and 56 counter-clockwise to bind or "bite" against the upper and lower surfaces of slide shaft 10. Upon further levering of lever 46 against binding plates 54 and 56, shaft 10 is forwardly carried by such plates through the hollow bore 12, 40, and 36 of quill 14. Such forwardly driven plate 24 because such plate has an angular orientation opposite those of plates 56 and 54, preventing such plate from binding or resisting such forward shaft sliding motion.

The distance between the upper surface of "T" pull 20 and the lower surface of the upper end of loop 18 is preferably slightly less than the vertical displacement between axle 62 and pin 64, such differential in distances mechanically preventing rocker arm 60 from hyper-rotating and disabling the mechanism.

Following the above described manual upward retraction of "T" pull handle 20, the operator described above, may loosen his or her grip upon the "T" pull handle 20. Such loosening of grip allows spring 58 to counter-lever lever 46 and rocker arm 62 in the clockwise direction, returning such structures to the positions depicted in FIG. 4. While such spring biased counter-levering movements occur, binding plate 24 resists any backsliding motion of slide shaft 10. Thereafter, a next successive manual upward pulling force may be applied to "T" pull handle 20 repeating the forward shaft driving reaction described above. A manually induced upward and downward reciprocating motion imposed upon "T" pull handle 20 within the opening of loop 18 operates to forcefully forwardly drive slide shaft 10 within the bore 12, 40, and 36 of quill 14.

Referring further to FIG. 4, to release slide shaft 10 for free sliding rearward motion within bore 12, 40, and 36, the operator may conveniently extend the thumb of the hand which grasps loop 18 about the upper hooked end of plate 24, drawing such plate in the manner of a lever in a counter-clockwise pivoting motion toward handle 16. Such levering action pivots plate 24 counter-clockwise within space 38 and against compression spring 52, releasing slide shaft 10 for free sliding motion.

Figure 2:
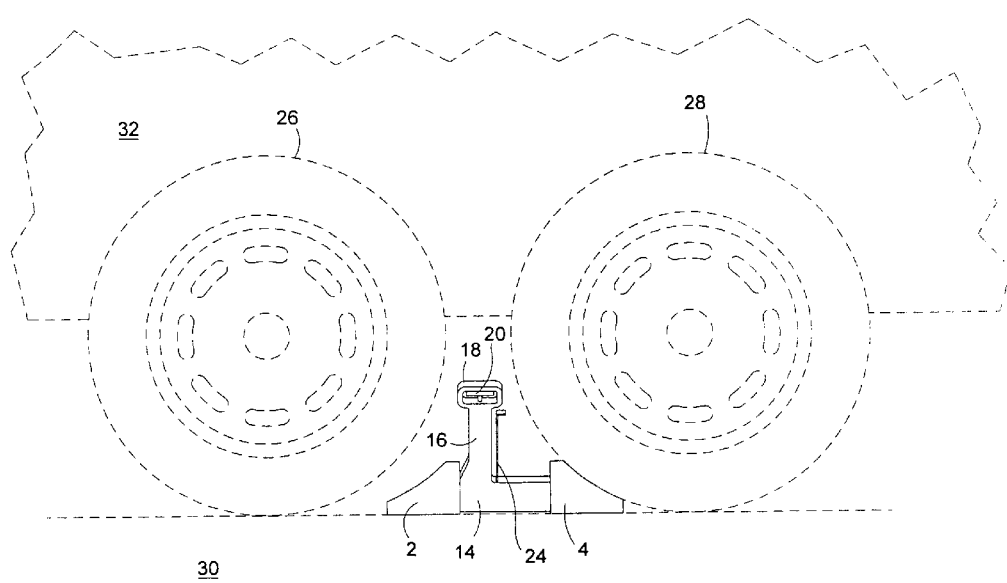
FIG. 2 is a side view of the invention of FIG. 1, the view showing the invention in its retracted tire chock configuration, the view further showing representationally the invention in a preliminary usage step upon a tandem wheel trailer.
Figure 3:
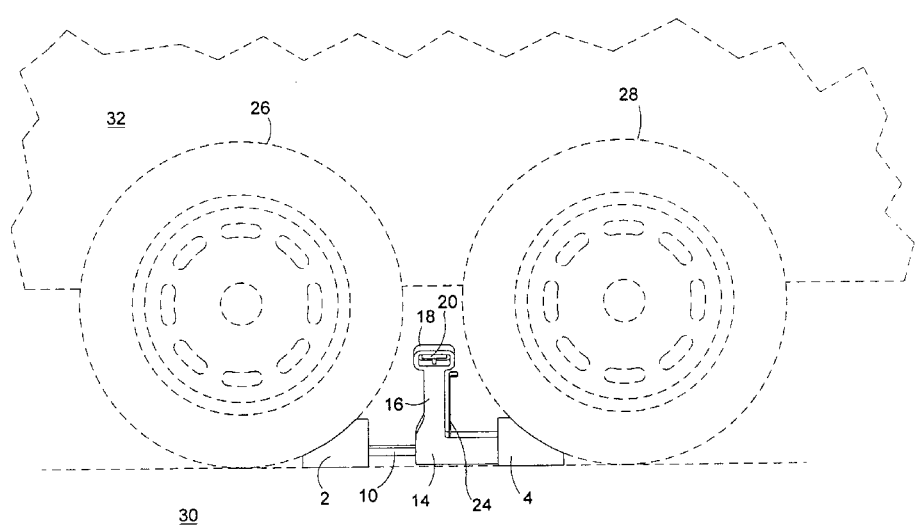
FIG. 3 redepicts FIG. 2, showing the invention in its extended tire chock configuration.

In operation of the instant inventive tire chocking apparatus, referring to FIG. 1, an operator may grasp loop 18 and utilize thumb pressure to pivot lever 24 counter-clockwise against handle 16, releasing slide shaft 10 for free sliding motion within quill 14. Thereafter, the forward or first tire chock 2 may be slidably moved rearwardly from the extended position depicted in FIG. 1 to the rearwardly retracted position depicted in FIG. 2. Thereafter, such operator may utilize loop 18 of handle 16 for carrying the apparatus 1 to the tandem axle trailer 32 depicted in ghost in FIG. 2, placing the apparatus 1 upon the surface of the pavement 30 between tires 26 and 28. Thereafter, the operator may intermittently apply hand gripping pressure to successively and repeatedly upwardly draw "T" pull handle 20 within loop 18. As a result of the mechanical linkages and reactions discussed above, such motion imposed upon "T"

pull 20 drives tire chock 2 from the position depicted in FIG. 2 to the position depicted in FIG. 3. Upon full longitudinal extension of tire chock 2, the curved faces 6 and 8 of chocks 2 and 4 forcefully bias against the curved surfaces of tires 26 and 28 while the lower surfaces of those chocks bias against the surface of pavement 30. While the apparatus 1 is configured and positioned as depicted in FIG. 3, the tandem axle trailer 32 is effectively secured against rolling in either the forward or the rearward direction.

In order to release and remove the apparatus 1 from its trailer securing configuration depicted in FIG. 3, the operator may conveniently utilize thumb pressure to rotate lever/plate 24 counter-clockwise toward handle 16, releasing slide shaft 10 for rearward sliding motion. Thereafter, handle 16 and loop 18 conveniently serve as a rocking lever for laterally rocking, loosening, and disengaging the apparatus 1, along with chocks 2 and 4 from their wedged positions beneath tires 26 and 28.

According to the principles of the instant invention, the vertical height or length of handle 16 and loop 18, along with vertical length of lever/plate 24 may suitably and desirably be extended upwardly for further ergonomic reduction of undesirable stooping in operation. As depicted in FIGS. 1–4, the handle 16 is fitted (for the sake of example) for ergonomic use by a wheelchair bound operator. Referring to FIG. 1, handle 16 and quill 14 are preferably laterally outwardly angled for further ease of access.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

The invention claimed is:

1. A tire chocking apparatus comprising:
   (a) first and second tire chocks;
   (b) a tire chock spreading mechanism interconnecting the first and second tire chocks, the tire chock spreading mechanism comprising a quill and shaft assembly;
   (c) a handle fixedly attached to or formed wholly with the tire chock spreading mechanism, the handle extending upwardly from the tire chock spreading mechanism, the handle having an upper end;
   (d) a reciprocatable member mounted moveably upon the handle's upper end; and
   (e) a drive linkage operatively interconnecting the reciprocatable member and the tire chock spreading mechanism; the tire chock spreading mechanism further comprising first and second apertured shaft binding plates, the shaft extending through said plates.

2. The tire chocking apparatus of claim 1 wherein the first and second shaft binding plates are normally spring biased to respective shaft releasing and shaft binding positions.

3. The tire chocking apparatus of claim 2 wherein the tire chock spreading mechanism further comprises a shaft drive lever mounted pivotally upon the quill, the shaft drive lever being adapted for moving the first shaft binding plate from its normal shaft releasing position to a shaft binding position, the drive linkages' operative interconnection of the reciprocatable member and the tire chock spreading mechanism further connecting the reciprocatable member to the shaft drive lever.

4. The tire chocking apparatus of claim 3 further comprising a shaft release lever fixedly attached to or formed wholly with the second shaft binding plate.

5. The tire chocking apparatus of claim 1 wherein each of the first and second tire chocks has an arcuately curved tire engaging face.

6. The tire chocking apparatus of claim 1 wherein the handle has a hollow bore.

7. The tire chocking apparatus of claim 6 wherein the drive linkage extends through the handle's hollow bore.

8. The tire chocking apparatus of claim 7 wherein the handle's upper end has a palm engaging surface, and wherein the reciprocatable member comprises a hook having a finger engaging surface, the finger engaging surface underlying the palm engaging surface.

9. The tire chocking apparatus of claim 8 wherein the drive linkage comprises a tie having an upper end, the hook extending from tie's upper end.

10. The tire chocking apparatus of claim 5 wherein the shaft releasing lever is co-extensive with the handle.

11. The tire chocking apparatus of claim 1 wherein each of the first and second tire chocks has a lower ground engaging surface, and wherein the handle further extends laterally with respect to the first and second tire chocks' ground engaging surfaces.

12. A tire chocking apparatus comprising:
   (a) first and second tire chocks;
   (b) a spreader jack interconnecting the first and second tire chocks;
   (c) a handle fixedly attached to or formed wholly with the spreader jack, the handle extending upwardly from the spreader jack, the handle having an upper end;
   (d) a reciprocatable member mounted moveably upon the handle's upper end; and
   (e) a drive linkage operatively interconnecting the reciprocatable member and the spreader jack; the spreader jack comprising a quill and shaft assembly; the spreader jack further comprising first and second apertured shaft binding plates, the shaft extending through said plates.

13. The tire chocking apparatus of claim 12 wherein the first and second shaft binding plates are normally spring biased to respective shaft releasing and shaft binding positions.

14. The tire chocking apparatus of claim 13 wherein the spreader jack further comprises a shaft drive lever mounted pivotally upon the quill, the shaft drive lever being adapted for moving the first shaft binding plate from its normal shaft releasing position to a shaft binding position, the drive linkages' operative interconnection of the reciprocatable member and the spreader jack further connecting the reciprocatable member to the shaft drive lever.

15. The tire chocking apparatus of claim 14 further comprising a shaft release lever fixedly attached to or formed wholly with the second shaft binding plate.

16. The tire chocking apparatus of claim 15 wherein the shaft releasing lever is co-extensive with the handle.

* * * * *